Jan. 17, 1961 A. Y. CAPART 2,968,806
METHOD AND DEVICE FOR IMPROVING THE RATIO BETWEEN THE
USEFUL SIGNAL AND THE INTERFERING SIGNAL WHICH
ARE PICKED UP BY WIRELESS RECEIVING SETS
Filed Aug. 13, 1957

Inventor
Alphonse Y. Capart
By Hammond & Littell
Attorneys 2,968,806

METHOD AND DEVICE FOR IMPROVING THE RATIO BETWEEN THE USEFUL SIGNAL AND THE INTERFERING SIGNAL WHICH ARE PICKED UP BY WIRELESS RECEIVING SETS

Alphonse Y. Capart, 94 rue de Trèves, Brussels, Belgium

Filed Aug. 13, 1957, Ser. No. 678,011
Claims priority, application Belgium July 2, 1957
5 Claims. (Cl. 343—700)

The present invention relates to a method and a device for improving the ratio between the useful signal and the interfering signal, which are picked up by wireless wave receiving sets, such as telegraph and radio sets, and those for television, radar, and direction finding, notably, by way of eliminating the effects caused by electrical interferences. These interferences have been studied since the beginning of wireless, in order to find suitable means for suppressing the disturbance they cause. It has been noted, that on the one hand they are of industrial origin, and in this case can be suppressed by well known means, and on the other hand they are of a meterological order, and all attempts which have been made to eliminate them, have been unsuccessful so far.

Some of these atmospheric interferences arise from electrical discharges which are more or less far away, that is to say from lighting, and the intensity of the interference which is transmitted to the receiver, depends amongst other things, on the energy and on the nature of the waves emanating from the electrical discharge, and of their state of attenuation at the time of reaching the aerial.

On the other hand, interferences can be generated in thundery weather in the close proximity of the receiving aerial, or their site may be the aerial itself, and hence such interferences may be particularly disturbing during the reception of radio transmission. In fact, as a result of the increased electrical field of the atmosphere—which, when thunder clouds are passing, can reach considerable values—it is possible, on the other hand, that in the proximity of the aerials, discharges are produced between metallic masses which are differently insulated from the earth, and that on the other hand, at the extremities of the active parts of the aerials, discharges are built up as a result of the taper or ring effects of the aerial, which are manifested by an intense crackling noise during the audition of radio transmission, and by a "misting" of the television reception.

However, it must be noted that certain interferences of a metero'ogical order, which are very disturbing, especially when receiving transmissions from stations which are relatively far away from the receiving aerial, can be produced not only in thundery weather, but also in the absence of a high gradient of atmospheric potential. In that connection it is known, that in any season, even in winter, water particles which are in suspension in the atmosphere in the form of clouds, or falling towards the earth in the form of rain or drizzle, frequently carry an electrical charge of opposite polarity to that of the earth, and hence, also opposite to that of the active parts of the aerials, which are electrically connected with the earth, through the input circuits of the receivers. When these charged particles, while travelling towards the earth, come in contact with the active parts of the aerials, they are neutralized thereon, this action causing an intense spitting noise which is continuous during the reception of wireless, and to a continuous "misting" of the television reception, as long as these particular weather conditions persist.

The method according to the invention, which consists mainly in exposing the active parts of the aerials to the effects from sources of alpha and/or beta rays, eliminates the causes of these electrical interferences, and results in a marked improvement of the ratio between the useful signal and interfering signal. To this effect, the active parts of the aerials are exposed to the ionising effect produced on the air by surfaces which have been provided with a radio-active preparation. The formation of an intense and constant zone of ionisation in the air, acting as an eliminator of electrostatic charges, allows the neutralization of the electrical charges of any nature, gradually as they approach the aerial, without which, there would be a loss of their electrical charge on contact with the active parts of the aerial, thus causing interferences which affect the receiving sets. Furthermore, by forming an ionised pathway, which necessarily ends in devices which are in good electrical connection with the earth, the displacement towards this pathway of electrical charges in the atmosphere is facilitated on the one hand, and on the other, a decrease of the atmospheric electrical potential is produced within an extended radius over the aerial, which is sufficient to suppress the local building up of electrical discharges between the metallic masses. Furthermore, taking into account the knowledge acquired on the subject of the reflection of electromagnetic waves by strongly ionised layers, it may also be expected that the zones of air ionised, according to the present invention, would have a certain screening effect against atmospheric interferences of limited amplitude.

A device for carrying out the method according to the invention, comprises one or several active elements of the aerial, and at least one source of alpha and/or beta rays which ionise the air. Radiating sources of this type, can be placed on the active elements of the aerials, for example on the extremities, and/or on a special support which is independent of the elements of the aerial. To this effect, the radiating sources are distributed on surfaces causing under the action of the wind, a rising movement of the masses of ionised air, and they are maintained at earth potential by means of an adequate earth lead. The sources of alpha and/or beta rays are preferably combined with a lightning conductor, and according to a first method of carrying out the invention, the device comprises a mast for carrying the active elements of the aerial, and a mast acting as a lightning conductor with an ionising action, these masts being at such a distance from one another, that the active elements of the aerials are under the action of the sources of alpha and/or beta rays. According to another mode of execution, the active elements of the aerial and the parts forming a lightning conductor with an ionising action, are mounted on one and the same mast. As sources of alpha and/or beta rays, preparations are preferably chosen which contain radio-active substances, as for example a radium salt or a suitable radio-active isotope. If a radium compound is used, it is best to choose a preparation in which this compound is covered with a thin metallic film impermeable to radon, but permeable to alpha rays.

The attached drawing shows as an example, several ways of carrying out the invention.

Figures 1, 2:
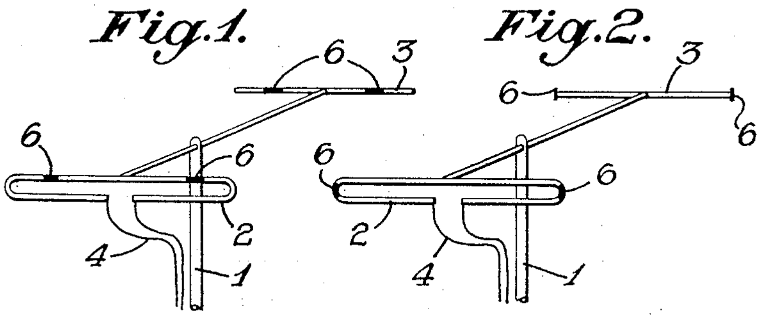
Figures 1 and 2 show dipole aerials provided with sources of alpha and/or beta rays, which are differently placed on the elements of the aerial.
Figure 3:
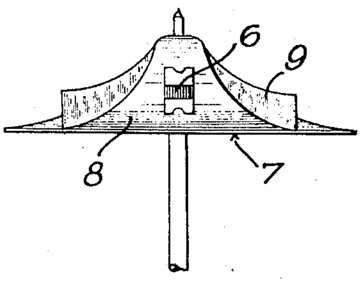
Figure 3 shows a support for the radiating sources, with deflecting surfaces.

In these figures, the aerial comprises on a mast 1, a bent dipole, a reflector 3 and a twin-wire lead-in which is symmetrical 4. The invention applies of course to all types of aerials, for example to dipole aerials which are open or closed, or possess other active elements and accessories, or an asymmetrical single-wire lead-in in the form of a coaxial screened cable. The sources of the alpha and/or beta rays 6, which are best formed by preparations containing a radium compound protected as described above, can be set out on the elements themselves of the aerial, for example on the upper branch of the bent dipole 2 and on the yard of the reflector 3 (Fig. 1), or on the extremities of these elements as shown in Fig. 2. In another modification, the radiating sources are set out on a special support, preferably on a support 7 having deflecting surfaces, which under the action of the wind cause a rising movement of the masses of ionised air, such as surfaces 8 and 9 (Fig. 3) or 11 (Fig. 4).

Figure 4:
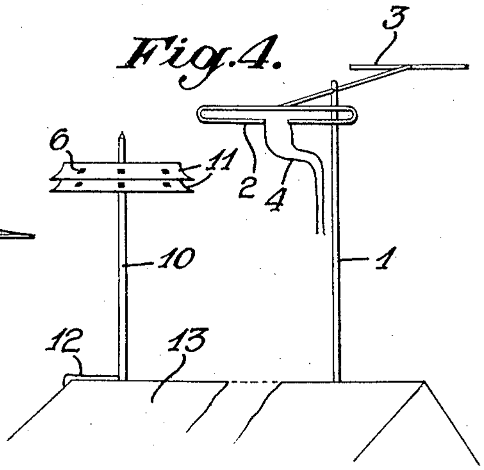
Figure 4 shows a device with two masts.

A support of this type of suitable dimensions, can be combined with a lightning conductor to form an ionising lightning conductor, comprising a mast 10, deflecting surfaces 11 with radio-active preparations 6, and an earth connection 12 of a section commonly used in installations for lightning protection, this mast 10 being at such a distance of the mast 1 which carries the elements of the aerial such as 2 and 3, that these latter are subjected to the ionising action of the lightning conductor on the air; this mast can either be fixed on the same roof 13 as mast 1, or on a different building (Fig. 4).

Figure 5:
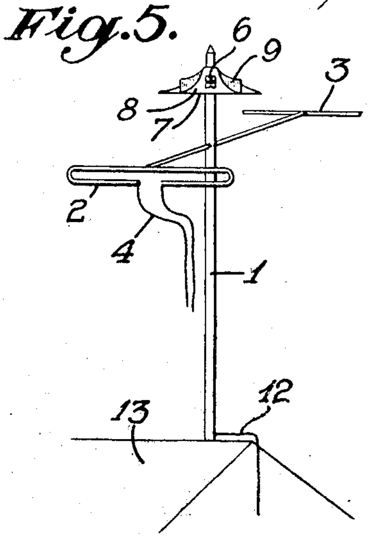
Figure 5 shows a device comprising one mast which carries the elements of the aerial, and the parts forming a lightning conductor with an ionising action.
Figure 6:
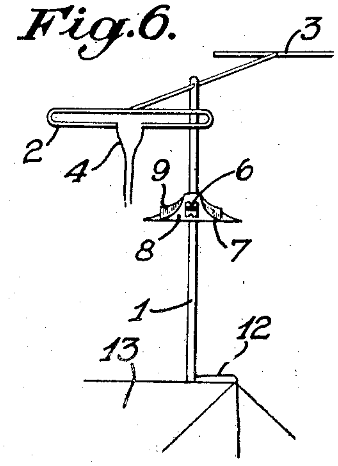
Figure 6 shows a similar device to that of Figure 5.

Favourably, the elements of the aerial such as 2 and 3, are placed on a mast 1 which forms together with the support 7 and the earth connection 12, an ionising lightning conductor (Fig. 5). The support 7, on which the radiating sources 6 are set out, can either be placed above the elements of the aerials (Fig. 5) or below them, as shown in Fig. 6. The support 7 is maintained at the earth's potential by the mast 1 and the lead-in 12.

The invention is of course not limited to the form of execution which have been described and shown here as an example, and it would be within its scope to modify it.

I claim:

1. A device for improving the ratio between the useful signal and the interfering signal received by wireless receiving sets comprising an antenna and means above said antenna for ionizing a volume of air above and separate from said antenna to protect said antenna from interfering signals.

2. A device for improving the ratio between the useful signal and the interfering signal received by wireless receiving sets comprising an antenna and a source of rays selected from the group consisting of alpha and beta rays positioned above said antenna to ionize a body of air above and separate from said antenna to protect said antenna from interfering signals.

3. A device for improving the ratio between the useful signal and the interfering signal received by wireless receiving sets comprising a mast, active aerial elements and an independent support member attached to said mast above said active aerial elements, said support member having a source of rays selected from the group consisting of alpha and beta rays to ionize a body of air above and separate from said antenna to protect said antenna from interfering signals.

4. A device for improving the ratio between the useful signal and the interfering signal received by wireless receiving sets comprising a first mast with active aerial elements, a second mast spaced apart from said first mast, said second mast having a source of rays selected from the group consisting of alpha and beta rays to ionize a body of air above and separate from said antenna to protect said antenna from interfering signals.

5. A device for improving the ratio between the useful signal and the interfering signal received by wireless receiving sets comprising an antenna and means above said antenna for ionizing a volume of air above and separate from said antenna to protect said antenna from interfering signals, said means comprising a member concave on its upper surface, said surface rising from the outer edges towards the middle and carrying a radioactive material, and a grounding means to maintain said ionizing means at the potential of the earth.

References Cited in the file of this patent

UNITED STATES PATENTS 1,154,127 Rasehorn et al. ---------- Sept. 21, 1915

FOREIGN PATENTS 680,452 France ------------------ Jan. 18, 1930

OTHER REFERENCES

"Radioactive Lightning Rod," St. Louis Post-Dispatch, Feb. 15, 1957, page 1.

UNITED STATES PATENT OFFICE

CERTIFICATION OF CORRECTION

Patent No. 2,968,806 January 17, 1961

Alphonse Y. Capart

It is hereby certified that error appears in the above numbered patent requiring correction and that the said Letters Patent should read as corrected below.

Column 1, line 31, for "lighting" read -- lightning --; line 44, for "other" read -- one --.

Signed and sealed this 29th day of August 1961.

(SEAL)
Attest:

ERNEST W. SWIDER
Attesting Officer

DAVID L. LADD
Commissioner of Patents